US007190259B2

(12) United States Patent
Kumata et al.

(10) Patent No.: US 7,190,259 B2
(45) Date of Patent: Mar. 13, 2007

(54) SURROUNDING SURVEILLANCE APPARATUS AND MOBILE BODY

(75) Inventors: Kiyoshi Kumata, Kyotanabe (JP); Kiyokazu Kitagawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 152 days.

(21) Appl. No.: 11/019,621

(22) Filed: Dec. 23, 2004

(65) Prior Publication Data
US 2005/0190082 A1 Sep. 1, 2005

(30) Foreign Application Priority Data
Dec. 25, 2003 (JP) ............................. 2003-431265

(51) Int. Cl.
*B60Q 1/00* (2006.01)
(52) U.S. Cl. ................... 340/435; 340/932.2; 348/148; 348/149; 359/533; 359/549; 359/839
(58) Field of Classification Search ................ 340/435, 340/932.2, 995.1, 461–2; 348/143, 148, 348/149, 153
See application file for complete search history.

(56) References Cited

U.S. PATENT DOCUMENTS

| 5,929,786 | A | * | 7/1999 | Schofield et al. | ............ | 340/903 |
| 6,130,783 | A | * | 10/2000 | Yagi et al. | ............ | 359/627 |
| 6,568,414 | B1 | * | 5/2003 | Fuchs et al. | ............ | 134/199 |
| 6,693,518 | B2 | | 2/2004 | Kumata et al. | | |
| 2002/0005896 | A1 | * | 1/2002 | Kumata et al. | ............ | 348/148 |
| 2004/0169762 | A1 | * | 9/2004 | Imoto | .................. | 348/340 |

FOREIGN PATENT DOCUMENTS

| EP | 1 197 937 A1 | 4/2002 |
| EP | 1 264 734 A2 | 12/2002 |
| EP | 1 452 899 A1 | 9/2004 |
| JP | 2001-331789 | 11/2001 |
| JP | 2002-034055 | 1/2002 |
| JP | 2002-059782 | 2/2002 |
| JP | 2002-218451 | 8/2002 |
| JP | 2003-125396 | 4/2003 |
| JP | 2003-125396 A | 4/2003 |
| JP | 2003-163819 | 6/2003 |
| JP | 2003-223633 A | 8/2003 |
| WO | WO 2004-068440 A1 | 8/2004 |

OTHER PUBLICATIONS

Japanese Office Action dated May 24, 2006.
European Search Report issued on Mar. 3, 2005.

* cited by examiner

*Primary Examiner*—Jeffery Hofsass
*Assistant Examiner*—Hongmin Fan
(74) *Attorney, Agent, or Firm*—Harness, Dickey & Pierce, P.L.C.

(57) ABSTRACT

A mobile body surrounding surveillance apparatus is provided which comprises an omnidirectional vision sensor comprising an optical system for reflecting light incident from a maximum surrounding 360-degree visual field area toward a predetermined direction and an imaging section for imaging light reflected from the optical system to obtain image data, an image processing section for processing the image data obtained by the imaging section, and a display section for displaying the image data processed by the image processing section on a display screen as a mobile body surrounding image. The omnidirectional vision sensor is provided on at least one of left and right sides of the mobile body with an optical axis of the omnidirectional vision sensor being horizontally oriented.

17 Claims, 11 Drawing Sheets

SURROUNDING SURVEILLANCE APPARATUS AND MOBILE BODY

This nonprovisional application claims priority under 35 U.S.C. §119(a) on Patent Application No. 2003-431265 filed in Japan on Dec. 25, 2003, the entire contents of which are hereby incorporated by reference.

BACKGROUND OF THE INVENTION

1. Field of the Invention

The present invention relates to a surrounding surveillance system for surveillance of surroundings of a mobile body, such as a vehicle for transporting persons or things, and a mobile body carrying the same.

2. Description of the Related Art

A recent increase in traffic accidents raises a significant public concern. Particularly, accidents caused by a pedestrian walking against traffic, angle crash of vehicles, rear-end crash of vehicles and the like frequently occur at intersections, such as Y-junction, crossroad and the like. A cause of traffic accidents occurring at such intersections is considered to be that both vehicle drivers and pedestrians have a narrow view compared to that required for confirmation of safety. As a result, drivers and pedestrians cannot pay sufficient attention to their surroundings, so that they cannot recognize danger quickly. Therefore, there is a keen demand for improvement of vehicles, arousal of driver's attention, improvement of roadway environment, and the like.

Conventionally, a traffic mirror is placed at an intersection, such as Y-junction, crossroad or the like, which obstructs a view, in order to improve the roadway environment. However, the view is still narrow in spite of the mirror, and the number of mirrors is not yet sufficient. Thus, safety measures are not sufficient.

To achieve the safety of a vehicle (particularly, to look behind for traffic), for example, a surveillance camera is provided at the rear portion of the vehicle and an image taken by the surveillance camera is displayed on a monitor placed at a side of a driver's seat or a dashboard (the camera and the monitor are connected via a cable). Such a system is widely used in large-size vehicles, such as buses and the like, and a portion of passenger vehicles. In this case, however, to assure safety in the lateral directions of the vehicle mostly relies on the vehicle driver's vision. Recognition of danger is frequently delayed at a place, such as an intersection, which obstructs the driver's view.

The above-described surveillance camera generally has a narrow vision. One such camera can be used to determine the presence or absence of an obstacle or the risk of collision with another object in one direction, but not in a wide range. In order to determine the presence or absence of an obstacle or the risk of collision with another object in a wide range, the angle of the camera needs to be changed, for example.

For example, Japanese Laid-Open Publication No. 2002-218451 discloses a method of displaying an image (overhead view) of a visual field oriented 90 degrees downward (downward along a vertical axis) using an omnidirectional vision sensor comprising an optical system capable of obtaining an image of a 360-degree visual field and capable of accurate central projection transformation of the image, and an imaging section for converting the optical image obtained by the optical system to image data. In this conventional technology, the omnidirectional vision sensor is provided on a bumper or an outside rearview mirror of a vehicle. Alternatively, for example, Japanese Laid-Open Publication No. 2003-125396 discloses a vehicle surrounding surveillance apparatus in which the omnidirectional vision sensor is incorporated into an outside rearview mirror of a vehicle.

When using a vehicle, the driver often encounters situations which should be handled while confirming safety. For example, the driver has to not only look forward when driving a vehicle, but also look at surroundings of the vehicle when starting it, and look at the right, left and rear directions of the vehicle when turning right or left or going in or out of a parking lot or a garage. Although it is very important for the driver to look and confirm the safety in these manners, the structure of a vehicle makes it difficult and troublesome for the driver to confirm the safety of a blind spot which cannot be viewed from the driver's seat.

In order to check a 360-degree area around a vehicle using the conventional surveillance camera, the driver of the vehicle needs to change the angle of the camera, which outputs an image to a monitor, depending on the current situation. Such manipulation is significantly troublesome for vehicle drivers.

In the surrounding surveillance apparatuses of Japanese Laid-Open Publication No. 2002-218451 and Japanese Laid-Open Publication No. 2003-125396, a single omnidirectional vision sensor can be used to obtain a 360-degree image around a vehicle. However, since the optical axis of the omnidirectional vision sensor is oriented along an axis normal to the ground, an area which is immediately below the omnidirectional vision sensor and near the vehicle is a blind spot due to the omnidirectional vision sensor itself. Therefore, such an area is a blind spot even if the omnidirectional vision sensor is provided on, or incorporated into, an outside rearview mirror. In this case, it is not possible to confirm the safety sufficiently.

The above-described techniques provide an image which is an overhead view or a bird's eye view obtained by projecting surrounding objects onto a projection plane (e.g., a road surface). Therefore, the image of a place at a distance from the center of a visual field is significantly distorted, so that such an image is observed by the vehicle driver with a sense of difficulty.

SUMMARY OF THE INVENTION

According to an aspect of the present invention, a mobile body surrounding surveillance apparatus is provided which comprises an omnidirectional vision sensor comprising an optical system for reflecting light incident from a maximum surrounding 360-degree visual field area toward a predetermined direction, and an imaging section for imaging light reflected from the optical system to obtain image data, an image processing section for processing the image data obtained by the imaging section, and a display section for displaying the image data processed by the image processing section on a display screen as a mobile body surrounding image. The omnidirectional vision sensor is provided on at least one of left and right sides of the mobile body with an optical axis of the omnidirectional vision sensor being horizontally oriented.

In one embodiment of this invention, the omnidirectional vision sensor is provided at a lower portion or an upper corner portion of an outside rearview mirror of the mobile body.

In one embodiment of this invention, the optical system has a hyperboloid mirror provided on one of convex surfaces of a two-sheeted hyperboloid generated by rotating a hyperbola around a z-axis, an optical axis of the imaging section coincides with a rotation axis of the hyperbola, and a principal point of a lens is provided at a position of one of two focal points of the hyperboloid mirror.

In one embodiment of this invention, the optical system has a plurality of convex mirrors having a focal point.

In one embodiment of this invention, the optical system comprises a main curved surface mirror which is provided on one of convex surfaces of a two-sheeted curved surface generated by rotating a curved line around a z-axis, wherein a tip portion of the convex surface is removed through which light is transmitted, and a sub-curved surface mirror is provided on the other convex surface. The optical axis of the imaging section coincides with a rotation axis of the curved line, and a principal point of a lens is provided at one of two focal points of the sub-curved surface mirror.

In one embodiment of this invention, the optical system comprises a main curved surface mirror which is provided on one of convex surfaces of a two-sheeted hyperboloid generated by rotating a hyperbola around a z-axis, wherein a tip portion of the convex surface is removed through which light is transmitted, and a sub-curved surface mirror is provided on the other convex surface. The optical axis of the imaging section coincides with a rotation axis of the curved line, and a principal point of a lens is provided at one of two focal points of the sub-curved surface mirror.

In one embodiment of this invention, the image processing section converts the image data obtained by the imaging section to at least one of panorama image data and perspective image data.

In one embodiment of this invention, the omnidirectional vision sensor is provided so that one of upper and lower visual field angles thereof is larger than the other.

In one embodiment of this invention, one of the upper and lower visual field angles of the omnidirectional vision sensor is between 5 degrees and 90 degrees and the other is between 50 degrees and 90 degrees.

In one embodiment of this invention, a visual field angle of the omnidirectional vision sensor closer to the mobile body is smaller than a visual field angle thereof farther from the mobile body.

In one embodiment of this invention, the omnidirectional vision sensor has a hyperboloid mirror which is provided closer to the mobile body, the hyperboloid mirror serving as the optical system, and the imaging section is provided outside the hyperboloid mirror.

In one embodiment of this invention, the omnidirectional vision sensor is swung in response to an open/close operation of the outside rearview mirror, and when the outside rearview mirror is open, the optical axis of the omnidirectional vision sensor is perpendicular to an anterior-posterior axis of the mobile body.

In one embodiment of this invention, the optical axis of the omnidirectional vision sensor is always perpendicular to an anterior-posterior axis of the mobile body.

In one embodiment of this invention, a center of an effective pixel region of an imaging device of the imaging section is shifted from the optical axis of the optical system so that the center of the effective pixel region of the imaging device is positioned above the optical axis of the omnidirectional vision sensor when the optical axis is horizontally oriented.

In one embodiment of this invention, the mobile body surrounding surveillance apparatus further comprises a display control section for controlling display of the display section. The display control section selects and controls a type and a size of an image of surroundings of the mobile body displayed on the display section.

In one embodiment of this invention, the mobile body surrounding surveillance apparatus further comprises a display control section for controlling display of the display section, and a mobile body location detecting section for detecting a location of the mobile body. The display section displays the location of the mobile body detected by the mobile body location detecting section as a location image on a map screen, and the display control section switches an image of surroundings of the mobile body and the location image.

According to another aspect of the present invention, a mobile body is provided which comprises the above-described mobile body surrounding surveillance apparatus.

Hereinafter, functions of the present invention will be described.

In the mobile body (e.g., a vehicle, etc.) surrounding surveillance apparatus of the present invention, the optical system of the omnidirectional vision sensor, whose optical axis is horizontally oriented, reflects light incident from a maximum surrounding 360-degree visual field area toward a predetermined direction. The imaging section images light reflected from the optical system to obtain image data. The optical system has a hyperboloid mirror provided on a convex surface which is one of the curved surfaces of a two-sheeted hyperboloid generated by rotating a hyperbola around a z-axis. The optical axis of the imaging section coincides with the rotation axis of the hyperbola, and the principal point of the lens is provided at the position of one of two focal points of the hyperboloid mirror. Alternatively, the optical system comprises a main curved surface mirror which is provided on one of convex surfaces of a two-sheeted hyperboloid generated by rotating a hyperbola around a z-axis, wherein a tip portion of the convex surface is removed through which light is transmitted, and a sub-curved surface mirror which is provided on the other curved surface curved surface. The optical axis of the imaging section coincides with a rotation axis of the curved line, and a principal point of a lens is provided at one of two focal points of the sub-curved surface mirror. The main mirror and the sub-mirror are not necessarily in the shape of a hyperboloid, and may be a convex mirror having a focal point.

Thus, a single omnidirectional vision sensor can be used to obtain a video of a maximum surrounding 360-degree visual field area. The video is subjected to central projection transformation and the resultant optical image is captured and converted to image data by the imaging section. The image data is converted to panorama image data or perspective image data by the image processing section. The resultant image data is displayed as a mobile body surrounding image on the display screen of the display section. A type (panorama image data, perspective image data, etc.) or display size of the image displayed on the display screen of the display section can be selected and controlled by the display control section. Further, a vehicle location detecting section (e.g., GPS, etc.) for detecting a location of a vehicle may be provided and the display control section may be used to switch a mobile body surrounding image and the location display images displayed on the display screen of the display section.

The omnidirectional vision sensor is provided at, for example, a lower position of at least one of left-and right-hand outside rearview mirrors (door mirrors) of a mobile body (e.g., a vehicle, etc.), which is a blind spot from the driver (user) with the omnidirectional vision sensor is horizontally oriented (the optical axis is horizontally oriented). Therefore, an overhead view image ranging from a front view to a rear view near a side of the vehicle, which is easy for the vehicle driver to understand, is obtained. Also, front and rear visual field images viewed from the outside rearview mirror (door mirror) as an eye point, which is easy for the vehicle driver to understand, are obtained.

The optical axis of the omnidirectional vision sensor is perpendicular to the anterior-posterior axis of the vehicle. Alternatively, the omnidirectional vision sensor is swung in response to an open/close operation of the outside rearview mirror, and when the outside rearview mirror is open, the optical axis of the omnidirectional vision sensor is perpendicular to the anterior-posterior axis of the mobile body. Thereby, a visual field image ranging from a front view to a rear view near a side of the mobile body, and an upper visual field area including a blindspot due to the outside rearview mirror can be obtained.

In order to view an area below and near a side of the mobile body, the lower visual field angle is preferably larger than the upper visual field. For example, the lower visual field angle is preferably between 5 degrees and 90 degrees and the upper visual field angle is preferably between 50 degrees and 90 degrees. When an upper visual field including a blind spot due to the outside rearview mirror of the mobile body (particularly, a vehicle), is not required, the center of the effective pixel region of the imaging device of the imaging section is shifted from the optical axis of the optical system so that the center of the effective pixel region of the imaging device is positioned above the optical axis of the omnidirectional vision sensor when the optical axis is horizontally oriented. Thereby, the upper visual field angle of the omnidirectional vision sensor can be reduced while the lower visual field angle can be increased. As a result, the pixels of the imaging device can be more effectively utilized.

By providing the hyperboloidal mirror closer to the mobile body and the imaging section farther from the mobile body, a visual field angle of the omnidirectional vision sensor closer to the mobile body can be caused to be smaller than a visual field angle thereof farther from the mobile body.

According to the present invention, an omnidirectional vision sensor is provided at a lower portion of an outside rearview mirror of a mobile body (e.g., a vehicle, etc.) with an optical axis of the sensor being horizontally oriented. Therefore, an area (e.g., an area below and near a side of a vehicle, etc.) which is a blind spot can be easily confirmed using the display screen of the display section provided at the driver's seat. Therefore, the driver can confirm the safety more accurately when the driver looks at surroundings of the vehicle when starting it, and looks at the right, left and rear directions of the vehicle when turning right or left or going in or out of a parking lot or a garage.

In conventional mobile body surrounding surveillance apparatuses, the driver has to switch the direction of a camera. Without such a manipulation, any display image, display direction, display size or the like can be switched and displayed using the display control section. Therefore, it is possible to prevent collision or the like by confirming safety easily by switching the display when, for example, moving the mobile body backward.

When going into or out of a parking lot or a garage or pulling over, the driver can confirm the safety easily by viewing an image having which is easy to understand to the driver, thereby making it possible to prevent collision.

Thus, the invention described herein makes possible the advantages of providing a mobile body surrounding surveillance apparatus which can provide an image of an area near a mobile body, which is easy to understand, to a driver (user), so that the driver can easily confirm the safety, and a mobile body carrying the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings. Particularly, the present invention is applied to a vehicle (passenger vehicle) in the following embodiments.

Figure 1A:
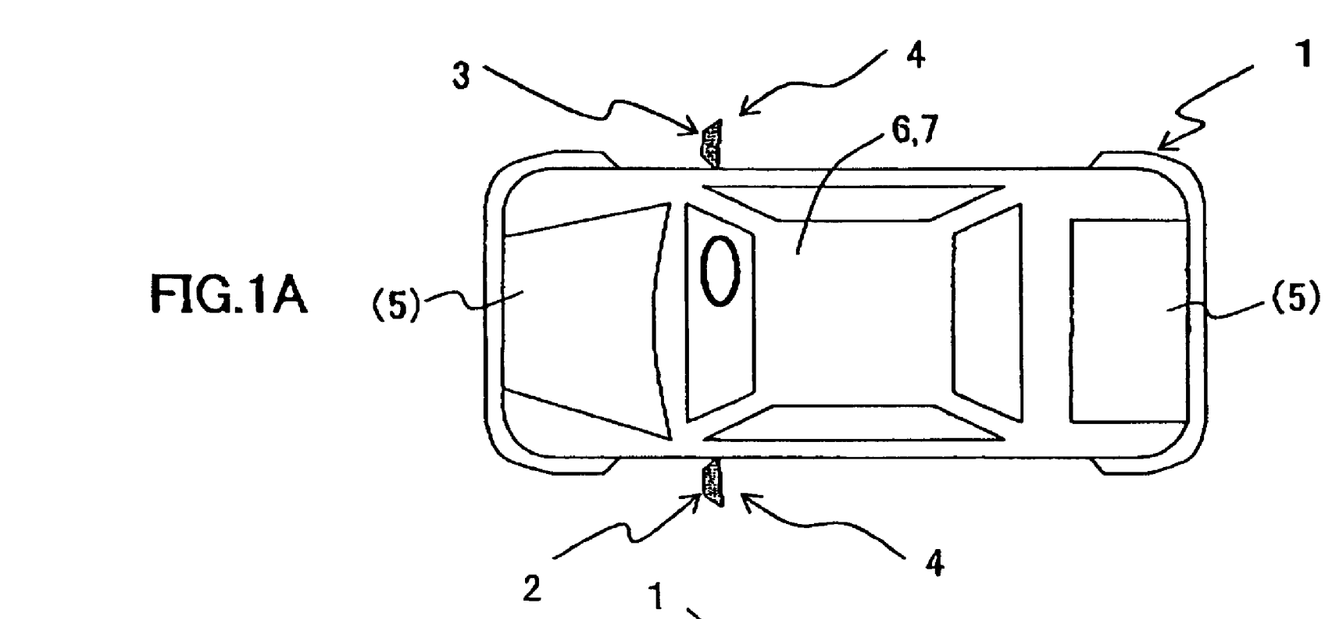
FIG. 1A is a top view showing a passenger vehicle carrying a vehicle surrounding surveillance apparatus according to an embodiment of the present invention.
Figure 1B:
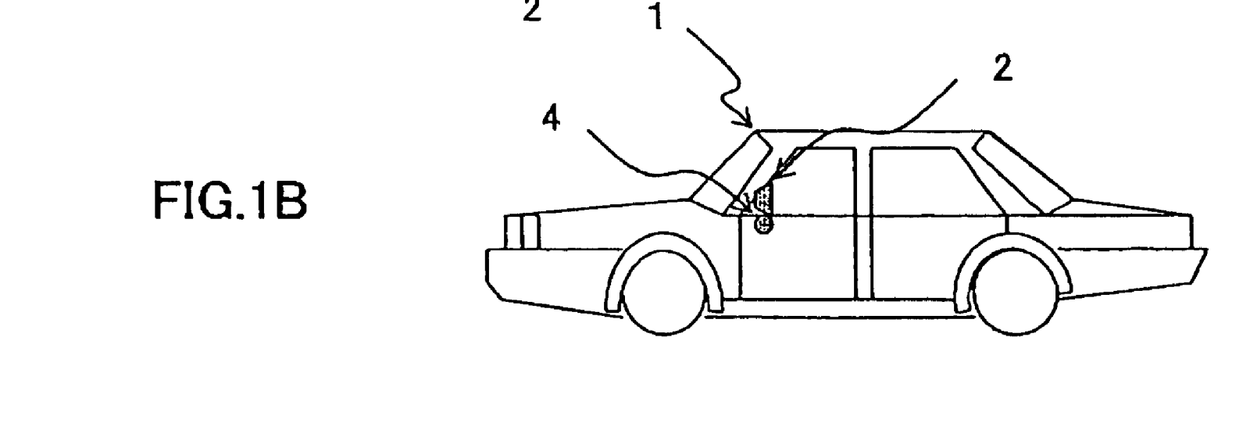
FIG. 1B is a side view thereof.
Figure 2A:
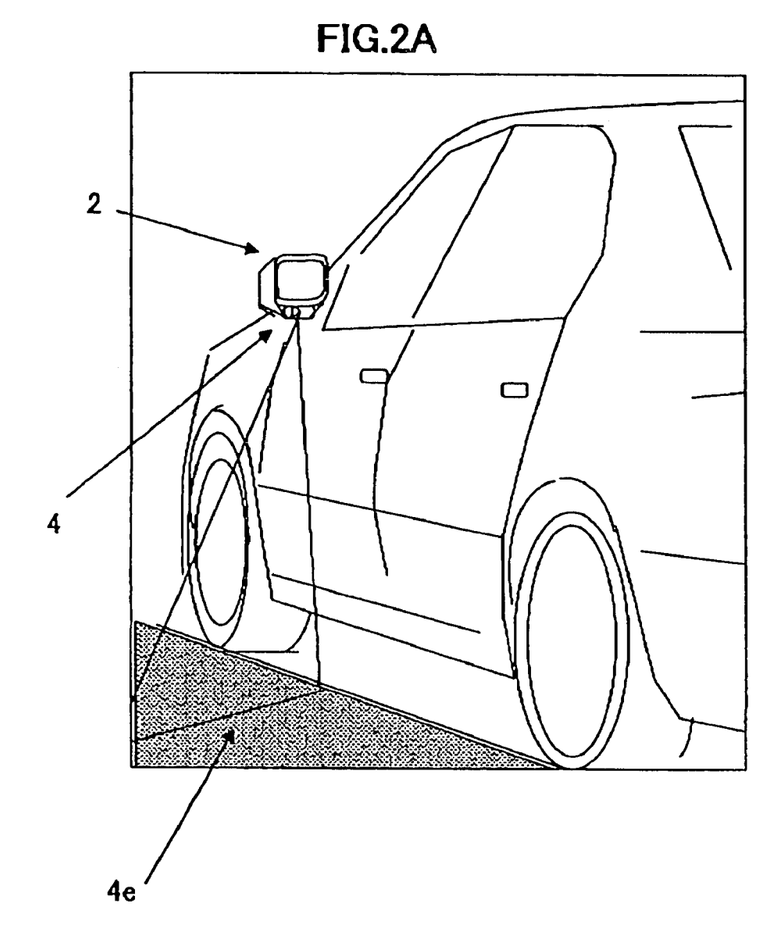
FIG. 2A is a diagram showing an omnidirectional vision sensor according to an embodiment of the present invention which is attached to a lower portion of an outside rearview mirror of the vehicle carrying the vehicle surrounding surveillance apparatus of FIGS. 1A and 1B.
Figure 2B:
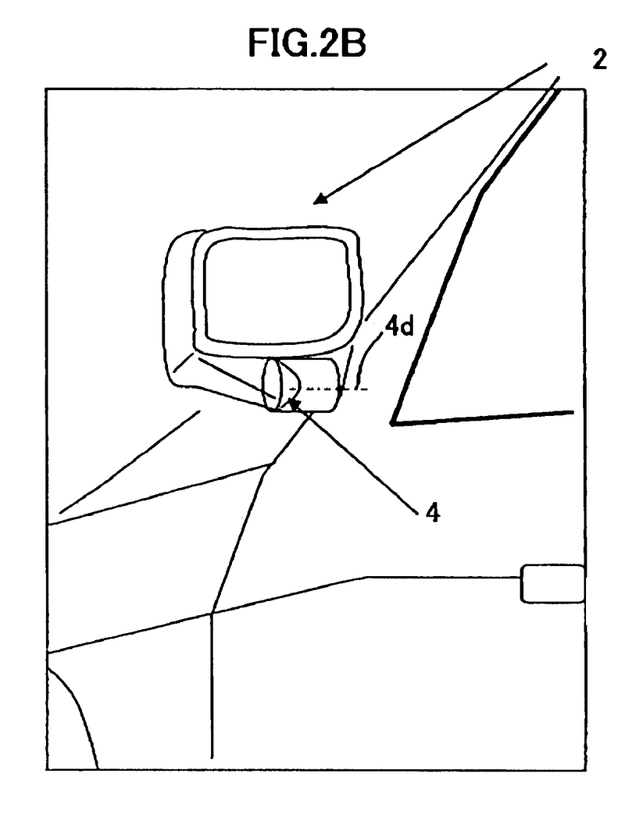
FIG. 2B is a partially enlarged view of FIG. 2A.

FIG. 1A is a top view showing a passenger vehicle carrying a vehicle surrounding surveillance apparatus according to an embodiment of the present invention. FIG. 1 is a side view thereof. FIG. 2A is a diagram showing an omnidirectional vision sensor according to an embodiment of the present invention which is attached to a lower portion of the outside rearview mirror of FIGS. 1A and 1B. FIG. 2B is a partially enlarged view of FIG. 2A.

Referring to FIGS. 1A, 1B, 2A and 2B, the omnidirectional vision sensor 4 is provided at a lower portion of each of left- and right-hand door mirrors 2 and 3 (outside rearview mirrors) of the vehicle (passenger vehicle) 1 with an optical axis 4*d* (FIG. 2B) of the omnidirectional vision sensor 4 being horizontally oriented. A driver's seat of the vehicle 1 is provided with a display section 6 and a display control section 7 for controlling the display section 6, for example, in or near a front dashboard, and an image processing section 5. The image processing section 5 may be composed of separate portions which are provided in a front engine room or a rear trunk of the vehicle 1.

Each omnidirectional vision sensor 4 is swung in response to an open/close operation of the corresponding outside rearview mirror 2 or 3. When the outside rearview mirrors 2 and 3 are open, the optical axis 4*d* of the omnidirectional vision sensor 4 is perpendicular to an anterior-posterior axis of the vehicle 1. Typically, when the vehicle 1 is driven, the outside rearview mirrors 2 and 3 are open. In this case, one omnidirectional vision sensor 4 obtains an image ranging from a front view to a rear view below the omnidirectional vision sensor 4 and at a side of the vehicle 1, i.e., an image of an about 180-degree visual field area 4*e* (FIG. 2A). The omnidirectional vision sensor 4 obtains an image of a maximum 360-degree visual field area around the omnidirectional vision sensor 4. The rest of the maximum 360-degree visual field area which is left after the visual field area 4*e* is subtracted is an upper visual field including a blind spot caused by the outside rearview mirror 2 or 3 of the vehicle 1.

When the vehicle 1 is not driven, the outside rearview mirrors 2 and 3 may be closed. In association with this, the omnidirectional vision sensor 4 is swung so that the omnidirectional vision sensor 4 does not protrude much from the vehicle 1.

It is preferable that a visual field angle in a direction of the optical axle 4*d* of the omnidirectional vision sensor 4 is determined so that the inner visual field angle (closer to the vehicle 1) is small and the outer visual field angle (farther from the vehicle 1) is large. This is because a larger inner visual field angle (closer to the vehicle 1) increases the proportion of the vehicle 1 in the obtained image, i.e., decreases the proportion of surroundings.

Figure 3:
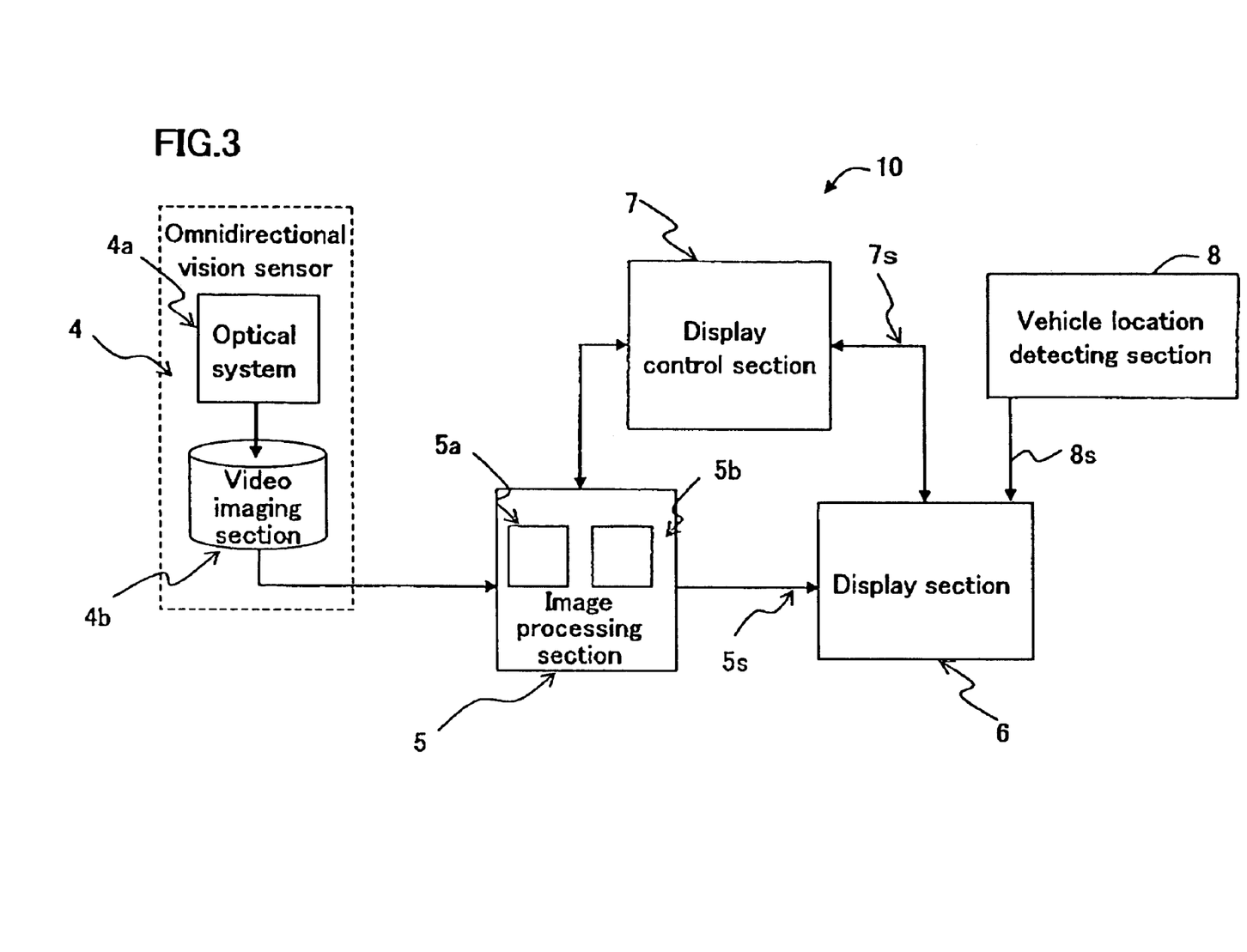
FIG. 3 is a block diagram for explaining a structure of a vehicle surrounding surveillance apparatus according to an embodiment of the present invention.

FIG. 3 is a block diagram showing a schematic structure of a vehicle surrounding surveillance apparatus according to an embodiment of the present invention.

Referring to FIG. 3, a vehicle surrounding surveillance apparatus 10 comprises an omnidirectional vision sensor 4 including an optical system 4*a* capable of central projection transformation and a video imaging section 4*b*, an image transformation section 5*a* and an output buffer memory 5*b*, an image comparison distance detecting section (not shown), an image processing section 5 for converting image data obtained by the video imaging section 4*b* to a panorama image, a perspective image (pseudo-overhead view image) or the like, a display section 6 for displaying image data (surroundings image data of the mobile body) 5*s* output from the image processing section 5 and image data (image data 8*s* about a location of a mobile body) output from a vehicle location detecting section 8 in a switching manner, and a display control section 7 for selecting and controlling a displayed image, a displayed direction, displayed image size or the like of a surrounding image of a mobile body and switching between the surrounding image of the mobile body and the location display using a control signal 7*a*. Note that the vehicle surrounding surveillance apparatus 10 may, or may not, include the vehicle location detecting section 8 as a mobile body location detecting section.

Hereinafter, parts of the vehicle surrounding surveillance apparatus 10 of the embodiment will be successively described.

The omnidirectional vision sensor 4 of FIG. 3 comprising the optical system 4*a* and the video imaging section 4*b* will be described in detail.

Figure 4:
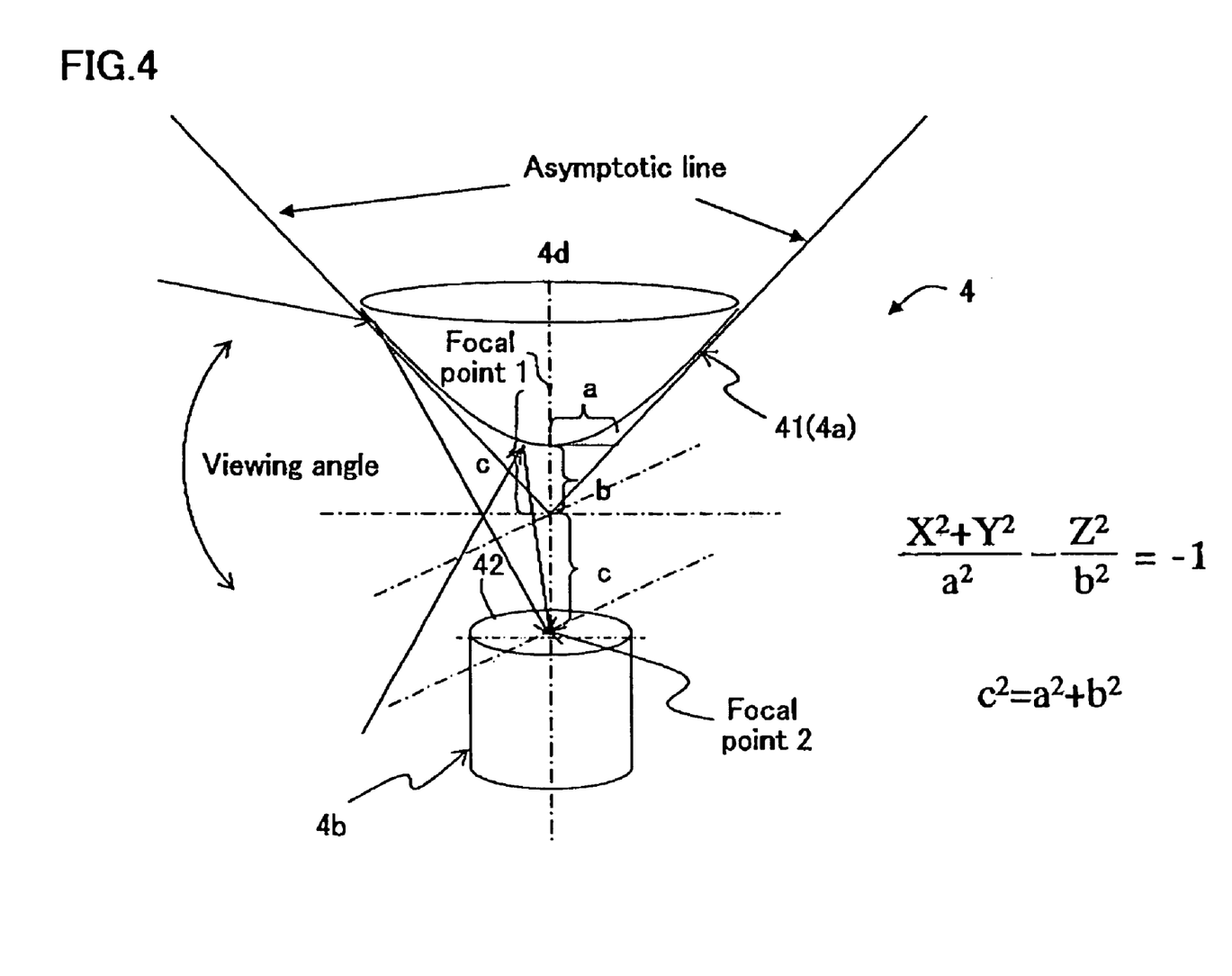
FIG. 4 is a perspective view showing an exemplary structure of an optical system of FIG. 3.

FIG. 4 is a perspective view showing an example of the optical system of FIG. 3 capable of obtaining a video of a surrounding 360-degree visual field area and capable of central projection transformation of the video, and the video imaging section of FIG. 3.

Referring to FIG. 4, the optical system 4*a* has a hyperboloidal mirror 41 and the video imaging section 4*b* has an imaging lens 42. The first principal point of the imaging lens 42 is positioned at one focal point (focal point 2) of the hyperboloidal mirror 41. Therefore, central projection transformation can be achieved. The details of the optical system 4*a* are described in Japanese Laid-Open Publication No. 6-295333, and therefore, only some features thereof will be herein described.

The hyperboloidal mirror 41 is formed by providing a mirror on a convex surface which is one of the curved surfaces (two-sheeted hyperboloid) generated by rotating a hyperbola around a z-axis (rotation axis 4*d*), i.e., a region of the two-sheeted hyperboloid where Z>0. This two-sheeted hyperboloid is represented as:

$$(X^2+Y^2)/a^2 - z^2/b^2 = -1$$

$$c^2 = a^2 + b^2 \qquad (1)$$

where a and b are constants which define the shape of the hyperboloid, and c is a constant which defines the positions of focal points.

The hyperboloidal mirror 41 has two focal points (a focal point 1 and a focal point 2). Light traveling from the outside to the focal point 1 is reflected from the mirror surface of the hyperboloidal mirror 41, and all the light travels toward the focal point 2. Therefore, the rotation axis 4*d* of the hyperboloidal mirror 41 is caused to coincide with the optical axis of the imaging section 4*b*, while the first principal point of the imaging lens 42 of the imaging section 4*b* is positioned at the focal point 2. As a result, an optical image captured by the imaging section 4*b* has a location of the eye point which does not vary depending on the direction of the visual field. A video of an area around the focal point 1 (eye point) can be converted to image data (central projection transformation).

The imaging section 4*b* is, for example, a camcorder. The imaging section 4*b* converts an optical image obtained via the hyperboloidal mirror 41 to image data using a solid-state imaging device, such as a CCD, a CMOS or the like. The converted image data is transferred to the subsequent image processing section 5.

Next, the image processing section 5 of FIG. 3 will be described in detail.

Figure 5:
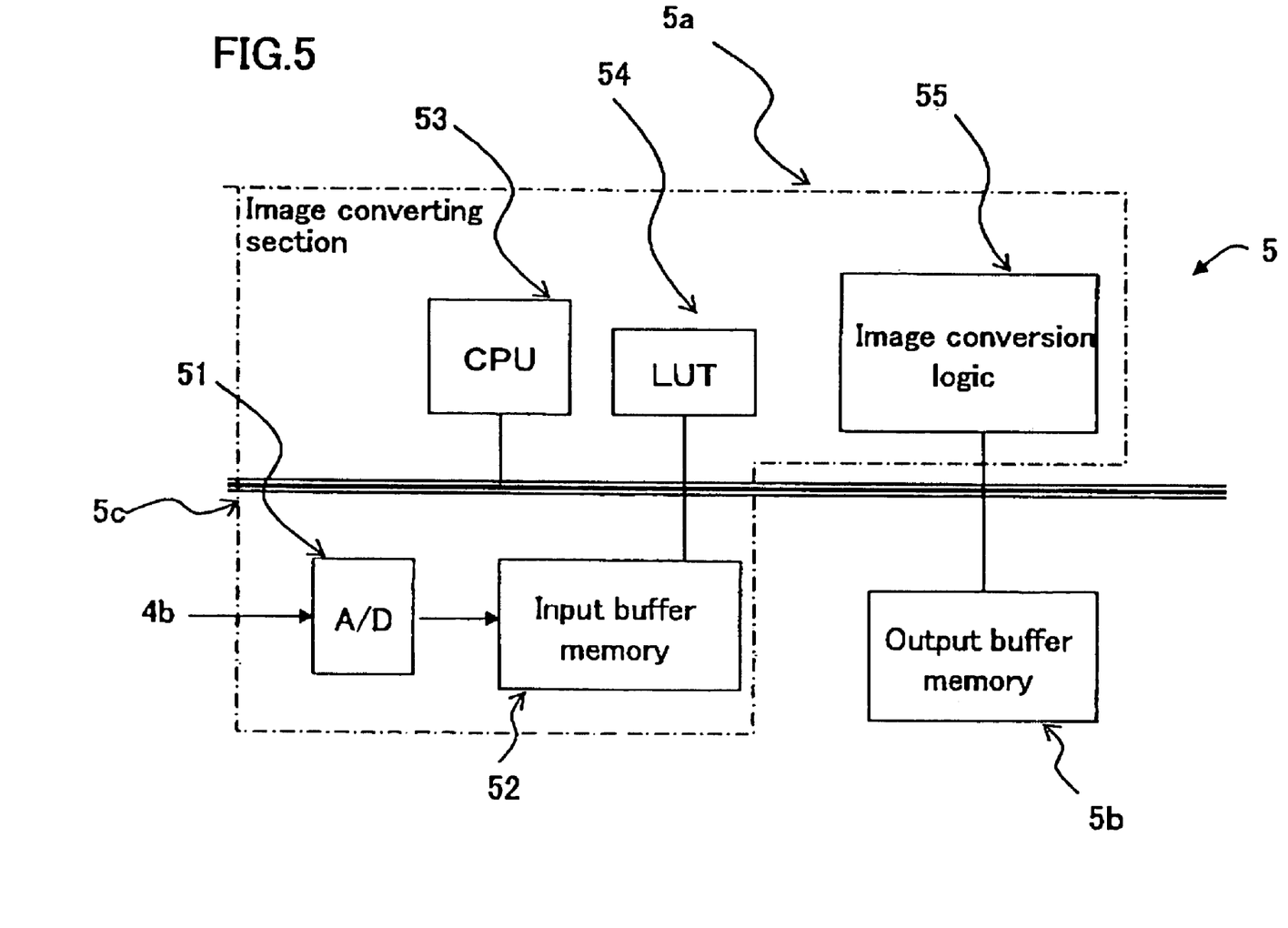
FIG. 5 is a block diagram view showing an exemplary structure of an image processing section of FIG. 3.

FIG. 5 is a block diagram showing an exemplary structure of the image processing section 5 of FIG. 3.

Referring to FIG. 5, the image processing section 5 comprises an A/D converter 51, an input buffer memory 52, a CPU 53 (central processing unit, control section), the image transformation section Sa including a lookup table 54 (LUT) and an image conversion logic 55, and the output buffer memory 5*b*, which are connected via a bus line 5*a*.

An image (image data) captured by the video imaging section 4*b* is converted, if it is an analog signal, to a digital signal by the A/D converter 51, and thereafter, the digital signal is input to the input buffer memory 52. Alternatively, the image (image data) captured by the video imaging section 4*b* is input directly to the input buffer memory 52, if it is a digital signal.

Thereafter, an output from the input buffer memory 52 is converted by the image conversion logic 55 to image data, such as panorama image, data, perspective image data or the like, followed by other image processing, and thereafter, is input to the output buffer memory 5b.

The image conversion logic 55 references data of the LUT 54 as required in image conversion or image processing. In the image transformation section 5a, each part can be controlled using the CPU 53 of a so-called RISC type.

The image data obtained by the omnidirectional vision sensor 4 is a circle image, which is difficult to obtain accurate visual information. Therefore, omnidirectional image data, which is a circle image, is not displayed directly onto a display screen of the display section 6. The entire image data is converted to image data, such as panorama image data, perspective image data or the like, and thereafter, the resultant data is displayed on the display screen of the display section 6. The details of the conversion process of the image conversion logic 55 which converts omnidirectional image data to panorama image data or perspective image data are described in, for example, Japanese Laid-open Publication No. 2001-333303 (Japanese Patent Application No. 2000-152207), and will not be explained.

Next, the display section 6 and the display control section 7 of FIG. 3 will be described.

The display section 6 is, for example, a monitor using a cathode-ray tube, an LED, an EL or the like. The display section 6 receives and displays the image data 59 output from the output buffer memory 5b of the image processing section 5, or the location of the vehicle 1 detected by the vehicle location detecting section 8, such as a GPS or the like, on a map screen. In this case, the display control section 7 including a microcomputer causes the display section 6 to display images (e.g., a panorama image or a perspective converted image obtained by the image processing section 5, the location display of the vehicle 1 detected by the vehicle location detecting section 8) in a switching manner, or controls a display direction, an image size or the like.

Figure 6A:
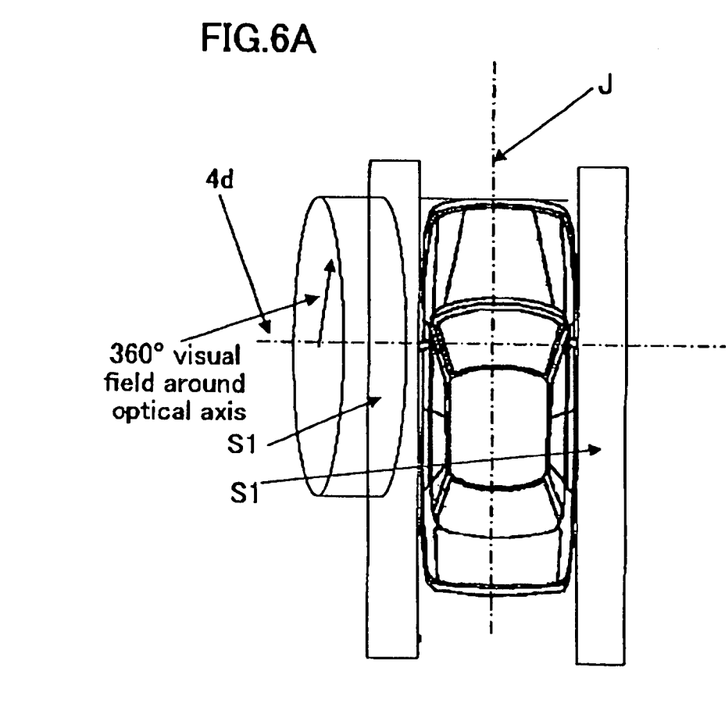
FIGS. 6A and 6B are top views for explaining a visual field area for the embodiment of the present invention and the conventional technology.
Figure 6B:
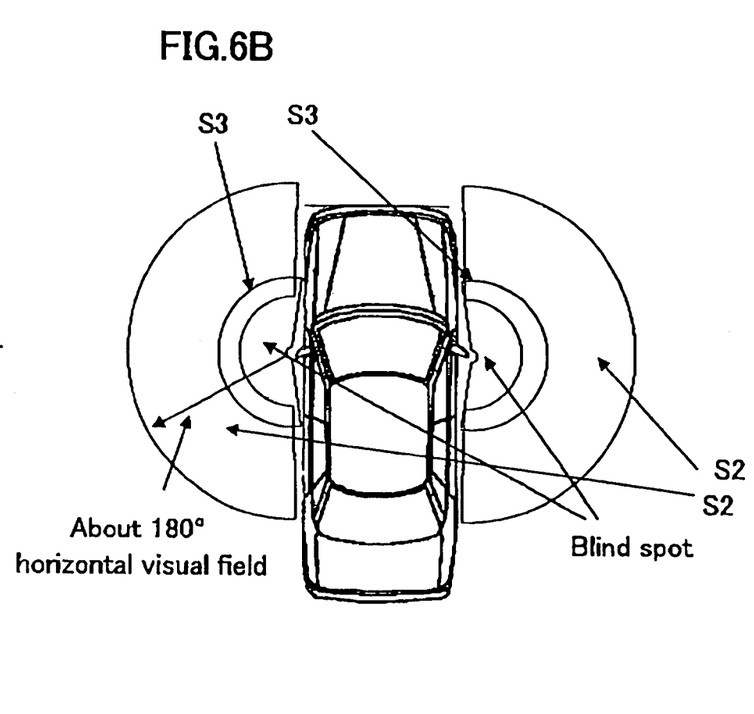

FIG. 6A shows a visual field area S1 obtained when the omnidirectional vision sensor 4 is provided at a lower portion of each of the outside rearview mirrors 2 and 3 with the optical axis 4d being horizontally oriented according to the embodiment of the present invention. FIG. 6B shows a visual field area S2 obtained when the omnidirectional vision sensor 4 is provided at a lower portion of each of the outside rearview mirrors 2 and 3 with the optical axis 4d being vertically oriented according to conventional technology or a visual field area 83 obtained when a typical camera is provided at a lower portion of each of the outside rearview mirrors 2 and 3 with the camera being oriented downward along a vertical axis.

Referring to FIG. 6B, in the conventional technology, for example, when the typical camera is provided at the lower portion of each of the outside rearview mirrors 2 and 3 with the camera being oriented downward along the vertical axis, the viewing angle of the camera is narrow, so that only small areas S3 around the outside rearview mirrors 2 and 3 are captured. When the omnidirectional vision sensor 4 is provided at the lower portion of each of the outside rearview mirrors 2 and 3 with the optical axis 4d being vertically oriented, videos of an about 180-degree horizontal visual field area and an about 180-degree lower visual field area S2 around the center of each of the outside rearview mirrors 2 and 3 are obtained. A lower visual field near the omnidirectional vision sensor 4, (an area near the vehicle 1) is a blind spot due to the omnidirectional vision sensor 4 itself.

In contrast, the omnidirectional vision sensor 4 of the embodiment of FIG. 6A is provided at a lower portion of each of the outside rearview mirrors 2 and 3 with the optical axis 4d being horizontally oriented, and the omnidirectional vision sensor 4 can be swung in response to the open/close operation of the outside rearview mirrors 2 and 3. When the outside rearview mirrors 2 and 3 are open, the omnidirectional vision sensor 4 is provided so that the optical axis 4d is perpendicular to an anterior-posterior axis J of the vehicle 1. Therefore, videos of a 360-degree visual field area S1 around the optical axis 4d of the omnidirectional vision sensor 4, i.e., an area ranging from a front view to a rear view below the omnidirectional vision sensor 4 at a side of the vehicle 1, and an upper visual field area including a blind spot caused by the outside rearview mirror 2 or 3 of the vehicle 1, are obtained.

Figure 7A:
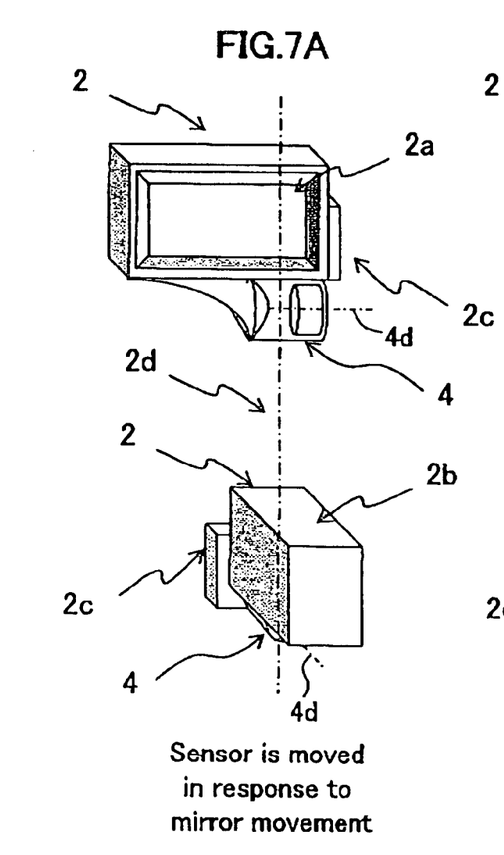
FIGS. 7A to 7C are diagrams for explaining a relationship between open/close of an outside rearview mirror of FIG. 2B and a direction of an omnidirectional vision sensor.
Figure 7B:
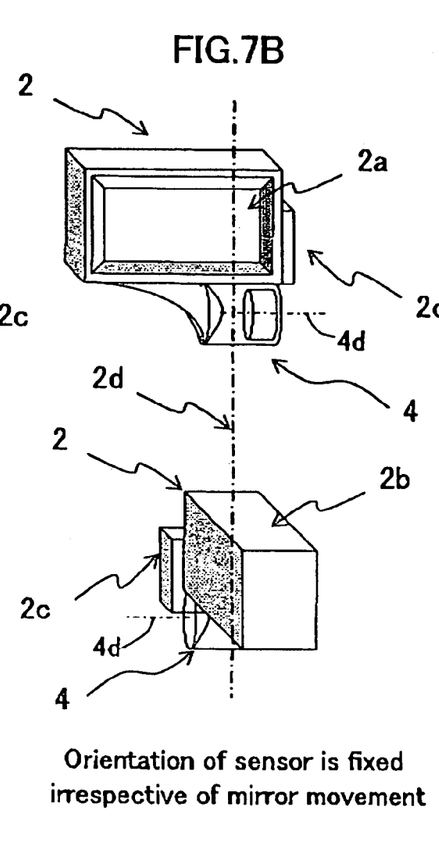
Figure 7C:
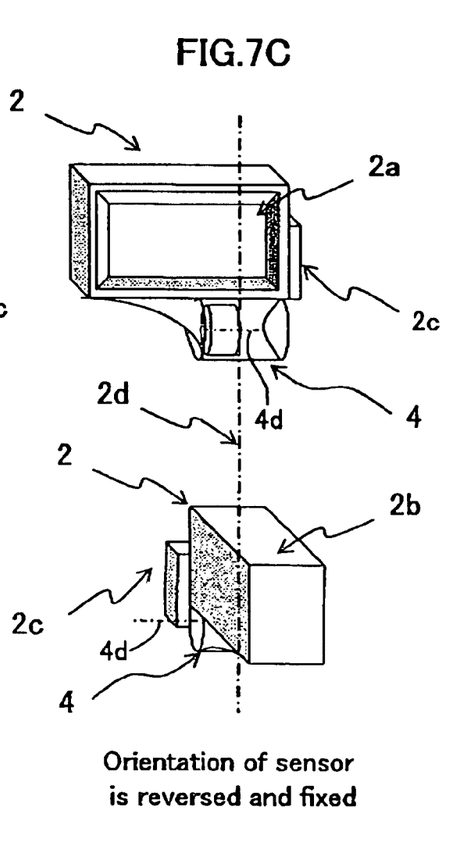

For example, FIG. 7A shows an enlarged view of the outside rearview mirror 2. When the outside rearview mirror 2 is swung around a rotation axis 2d, the omnidirectional vision sensor 4 is also swung in association with the outside rearview mirror 2. In this case, a visual field in an anterior-posterior direction is narrow in a narrow place which requires the outside rearview mirror 2 to be closed. To avoid this, as shown in FIGS. 7B and 7C, the omnidirectional vision sensor 4 may be fixed so that the optical axis 4d of the omnidirectional vision sensor 4 is horizontal and perpendicular to the anterior-posterior axis of the vehicle 1 no matter whether the outside rearview mirror 2 is opened or closed, and the omnidirectional vision sensor 4 is prevented from protruding from the outside rearview mirror 2 when the outside rearview mirror 2 is closed. In FIG. 7B, even if the visual field angle is increased with respect to the vehicle 1, the reflection of the vehicle 1 is only increased. Therefore, as shown in FIG. 7C, it is preferable that the direction of the omnidirectional vision sensor 4 is reversed so that the imaging section 4b is positioned on the outer side while the optical system 4a is positioned on the inner side. In this case, the visual field angle from the optical axis 4d toward the vehicle 1 (inward) is small, while the outward visual field angle is large. Note that, in FIGS. 7A to 7C, a housing 2b holding a mirror portion 2a of the left-hand outside rearview mirror 2 is attached to an attachment 2c in a manner which allows the housing 2b to swing around the rotation axis 2d.

Figure 8:
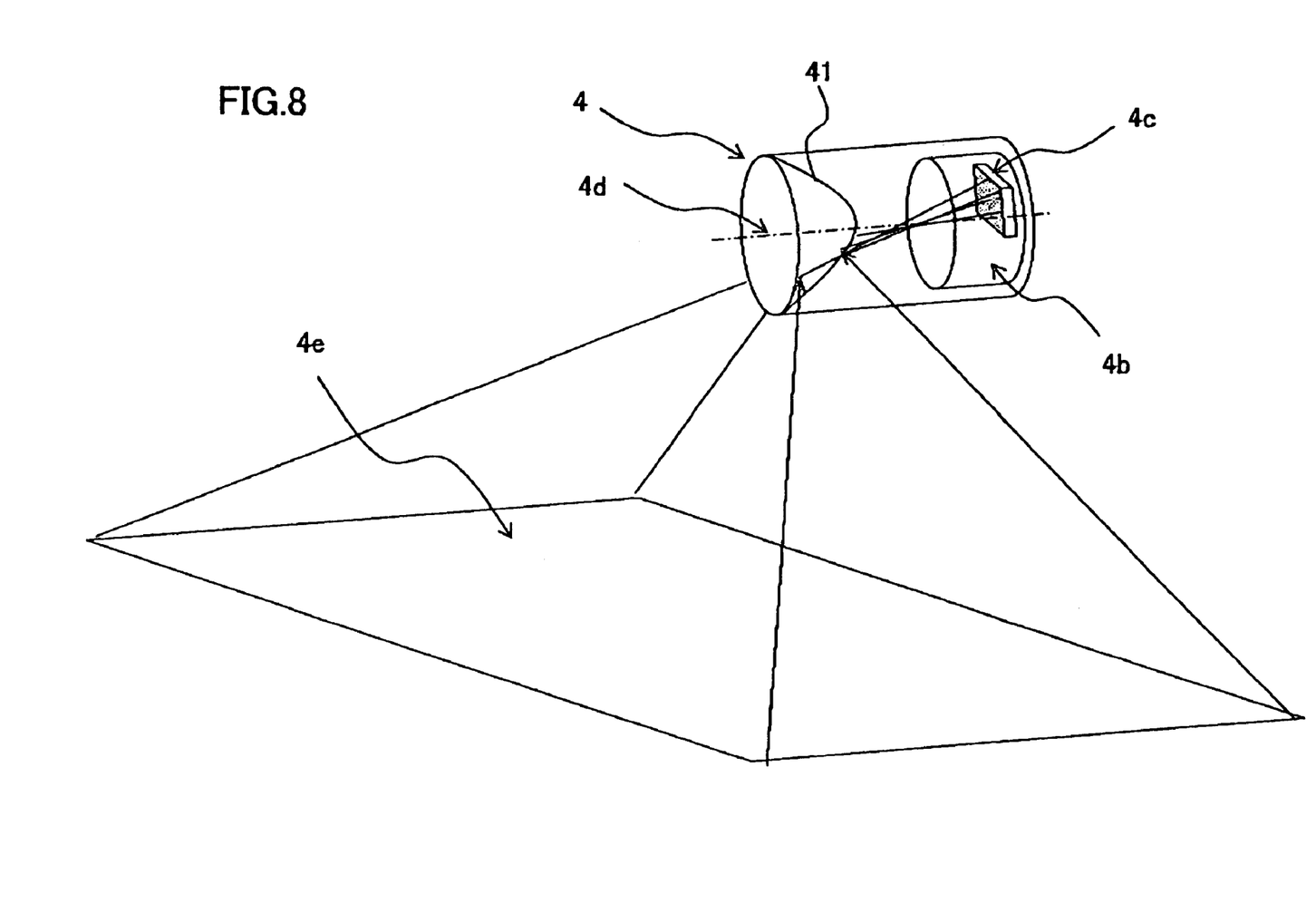
FIG. 8 is a perspective view of the vehicle surrounding surveillance apparatus of the embodiment where a center of an effective pixel region of an imaging device is shifted from an optical axis of the optical system.

A visual field area above the vehicle 1, which includes a blind spot due to the outside rearview mirror 2 (door mirror), may not be required. In this case, for example, as in FIG. 8, in the imaging section 4b of the omnidirectional vision sensor 4, a center position of an effective pixel region of an imaging device 4c may be shifted from the optical axis 4d of the optical system (hyperboloidal mirror 41) so that the imaging device 4c is positioned above the optical axis 4d with the omnidirectional vision sensor 4 being kept in the horizontal direction. As a result, a video of the visual field area 4e below the omnidirectional vision sensor 4 is input to the pixel region of the imaging device 4c, thereby making it possible to effectively utilize pixels of the omnidirectional vision sensor 4, and therefore, image quality is improved.

Figure 9:
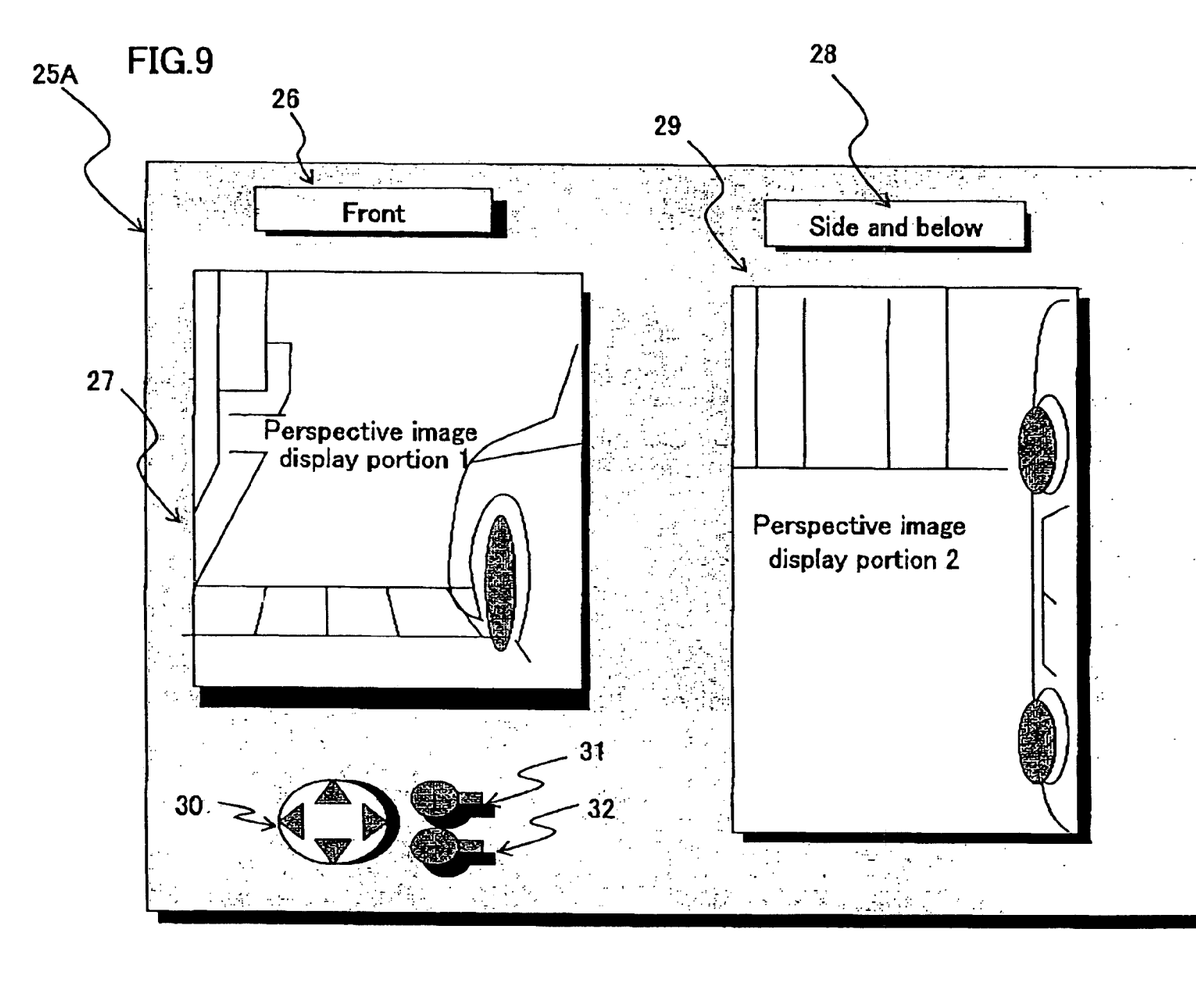
FIG. 9 is a schematic diagram showing an exemplary display screen displayed on the display section of FIG. 3.

FIG. 9 is a diagram showing an exemplary display screen displayed on the display section 6 of FIG. 3. In FIG. 9, the omnidirectional vision sensor 4 is provided at the lower portion of the outside rearview mirror of the vehicle 1 with the optical axis 4d being horizontally oriented. In this case, the perspective image displays a substantially horizontal visual field with respect to a portion ranging over a predetermined distance in the left and right directions.

Referring to FIG. 9, a display screen 25a has an explanation display portion 26 for explaining an image display portion immediately therebelow, a perspective image display section 27 for displaying a perspective image of a left-front side of the vehicle 1 as a default, an explanation display section 28 for explaining an image display portion immediately therebelow, a perspective image display section 29 for displaying a perspective image below a side of the vehicle 1 as a default, an up, down, left and right direction key 30, an image scale-up key 31, and an image scale-down key 32.

The explanation display portions 26 and 28 are active switches for the image display portions 27 and 29 immediately therebelow, respectively. The user manipulates the explanation display portions 26 and 28 to move the respective image display portions 27 and 29 in the up, down, left or right direction or scale up or down them. By changing the display colors of the explanation display portions 26 and 28, it is shown that the image display portions 27 and 29 are active. When the image display portions 27 and 29 are active, the image is moved in the up, down, left or right direction or is scaled up or down by manipulating the direction key 30, the scale-up key 31 and the scale-down key 32.

For example, when the user manipulates the explanation display portion 26, the manipulation causes a signal to be transmitted to the display control section 7. The display control section 7 changes the display color of the explanation display portion 26 to a color indicating the active state, or causes the explanation display portion 26 to flicker while causing the perspective image display section 27 to be active. In this case, when the user manipulates the direction key 30, the scale-up key 31 and the scale-down key 32, the display control section 7 responds to the manipulation and transmits a signal to the image transformation section 5a of the image processing section 5. Image data converted in response to each key manipulation is transmitted to the display section 6 and is displayed on the perspective image display section 27.

In the perspective image display section 27, a front image viewed from an eye point which is the outside rearview mirror is displayed, where a portion which is at a predetermined distance or more from the center of the omnidirectional vision sensor 4 in the visual field direction (optical axis) is displayed as a substantially horizontal visual field. As a result, an image which is not distorted much and is easy to understand to the vehicle driver is obtained. The perspective image display section 29 shows an overhead view image ranging from a front view to a rear view near a side of the vehicle 1, which is easy to understand to the vehicle driver.

Figure 10:
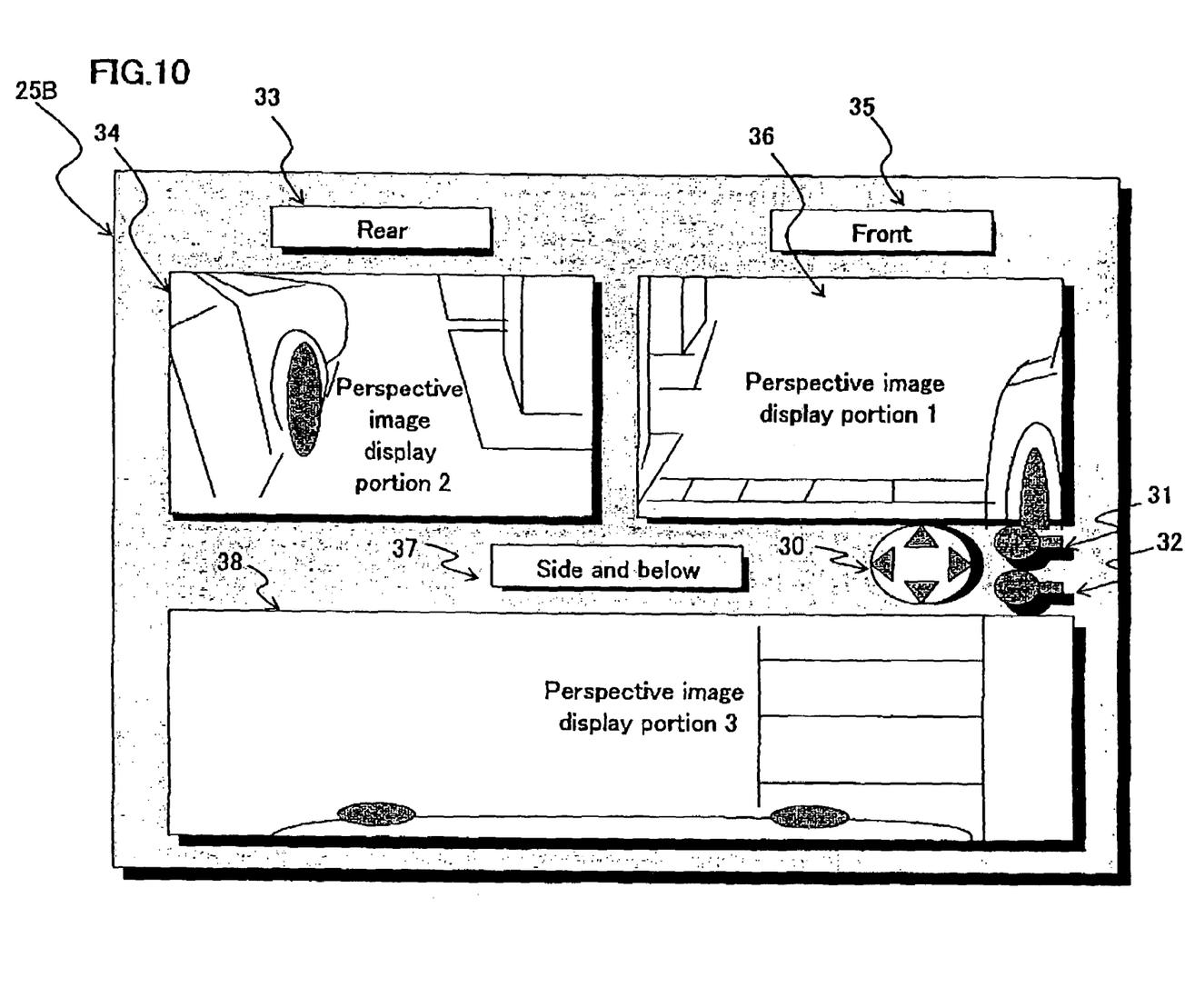
FIG. 10 is a schematic diagram showing another exemplary display screen displayed on the display section of FIG. 3.

FIG. 10 is a diagram showing another exemplary display screen displayed by the display section 6 of FIG. 3. In FIG. 10, the omnidirectional vision sensor 4 is provided on a front or rear bumper of the vehicle 1 or on a corner position of a hood thereof. The pseudo-overhead view display is provided such that a surround portion which is at a predetermined distance or more from the omnidirectional vision sensor 4 (on either the left or right side of the vehicle 1 on which the omnidirectional vision sensor 4 is attached, and the front or rear side thereof) is displayed as a substantially horizontal visual field.

Referring to FIG. 10, a display screen 25b displays an explanation display portion 33 for explaining an image display portion immediately therebelow, a perspective image display portion 34 for displaying a perspective image of a rear view of the vehicle 1 as a default, an explanation display portion 35 for explaining an image display portion immediately therebelow, a perspective image display portion 36 for displaying a perspective image of a front view of the vehicle 1 as a default, an explanation display portion 37 for explaining an image display portion immediately therebelow, a perspective image display portion 38 for displaying a perspective image of a down and near view of the vehicle 1 as a default, an up, down, left and right direction key 30, an image scale-up key 31, and an image scale-down key 32.

The explanation display portions 33, 35 and 37 are active switches for the image display portions 34, 36 and 38 immediately therebelow, respectively. The user manipulates the explanation display portions 33, 35 and 37 to move the respective image display portions 34, 36 and 38 in the up, down, left or right direction or scale up or down them. By changing the display colors of the explanation display portions 33, 35 and 37, it is shown that the image display portions 34, 36 and 38 are active. When the image display portions 34, 36 and 38 are active, the image is moved in the up, down, left or right direction or is scaled up or down by manipulating the direction key 30, the scale-up key 31 and the scale-down key 32.

Referring to FIG. 10, in the perspective image display section 34, a rear image viewed from an eye point which is the outside rearview mirror 2 is displayed, where a portion which is at a predetermined distance or more from the center of the omnidirectional vision sensor 4 in the visual field direction (optical axis) is displayed as a substantially horizontal visual field. As a result, an image which is not distorted much and is easy to understand to the driver of the vehicle 1 is obtained. The perspective image display section 38 shows an overhead image ranging from a front view to a rear view near a side of the vehicle 1, which is easy to understand to the driver of the vehicle 1.

As described above, according to the embodiments of the present invention, the omnidirectional vision sensor 4 comprises the optical system 4a for reflecting light incident from a maximum surrounding 360-degree visual field area and the video imaging section 4b for imaging light reflected from the optical system 4a to obtain image data, and the omnidirectional vision sensor 4 is provided at the lower portion of each of the outside rearview mirrors 2 and 3 of the vehicle 1 with the optical axis 4d being horizontally oriented. Therefore, an overhead view image ranging from a front view to a rear view near a side of the vehicle 1, which is easy to understand to the vehicle driver, is obtained. Also, front and rear visual field images viewed from the outside rearview mirrors 2 and 3 as eye points, which is easy to understand to the vehicle driver, are obtained. Thus, an area below a side of the vehicle 1, which is a blind spot to the driver, can be easily understood and confirmed as an image having a less sense of difference, thereby making it possible to achieve the vehicle surrounding surveillance apparatus 10 capable of providing a higher level of security.

In the above-described embodiment, a single sheet of the hyperboloidal mirror 41 as shown in FIG. 4 is used as the optical system 4a capable of central projection transformation, for example. Alternatively, an optical system comprising two hyperboloid mirrors 43 and 44 as shown in FIG. 11, which is capable of central projection transformation, can be used to achieve the object of the present invention.

Figure 11:
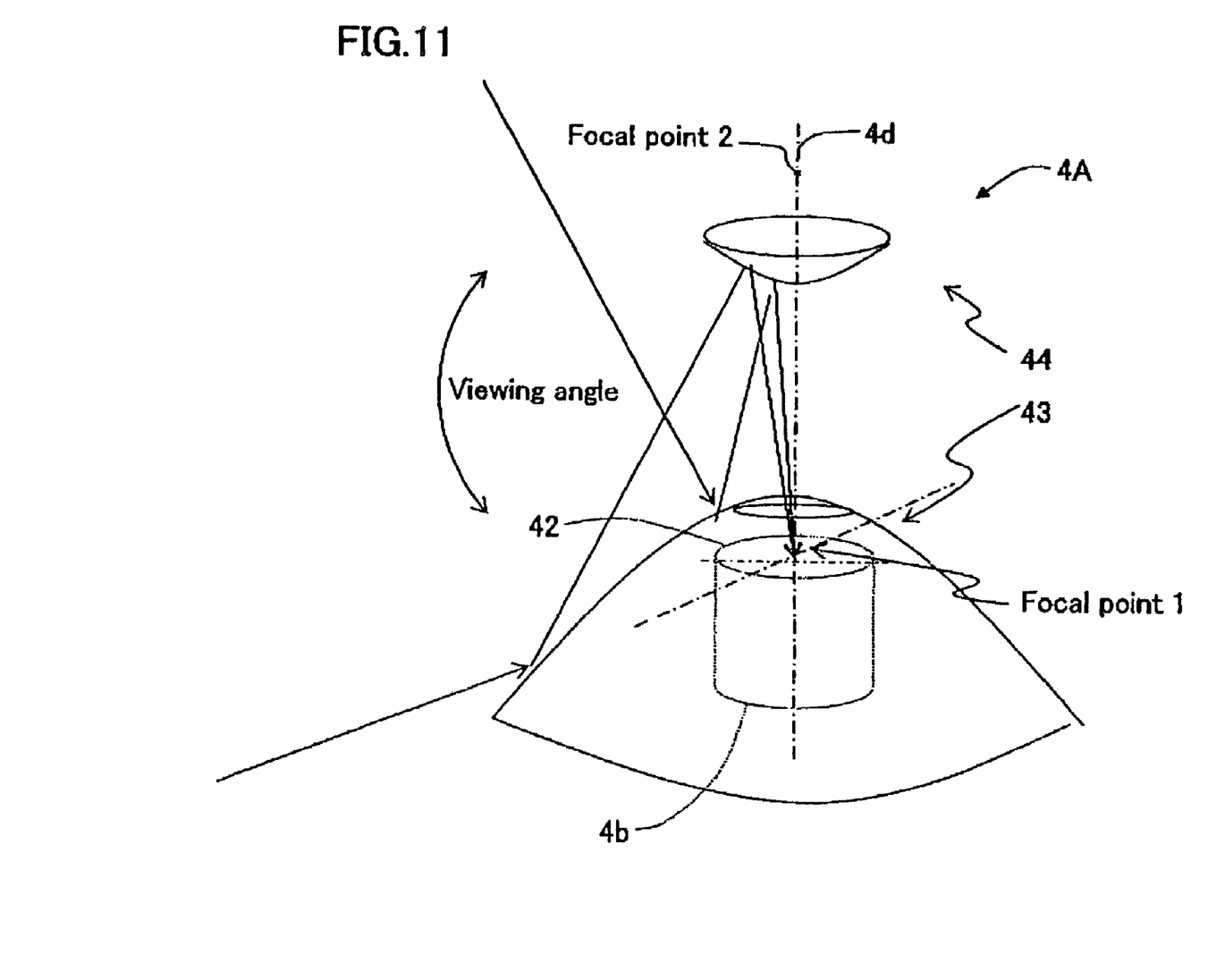
FIG. 11 is a perspective view showing another exemplary structure of the optical system of FIG. 3.

Referring to FIG. 11, an omnidirectional vision sensor 4a comprises a main hyperboloid mirror 43 and a sub-hyperboloid mirror 44, where the position of a focal point 2 of the main hyperboloid mirror 43 coincides with the position of a focal point 2 of the sub-hyperboloid mirror 44. Further, the rotation axis 4d of a hyperbola (the optical axis of the hyperboloid mirrors 43 and 44) coincides with the optical axis of the imaging section 4b, and the position of another focal point 1 of the hyperboloid mirror 44 coincides with the principal point of a lens 42 of the imaging section 4b. A tip of a convex portion of the hyperboloid mirror 43 has no mirror surface, through which light is transmitted.

In the omnidirectional vision sensor 4*a*, light traveling toward the focal point 1 of the hyperboloid mirror 44 is reflected from the hyperboloid mirror 43 toward the focal point 2 of the hyperboloid mirror 44. The light traveling toward the focal point 2 of the hyperboloid mirror 44 is reflected from the hyperboloid mirror 44 toward the focal point 1 of the hyperboloid mirror 44, and is transmitted through the convex tip portion of the hyperboloid mirror 43 and is captured by the imaging section 4*b*. Therefore, an image captured by the imaging section 4*b* has an eye point which docs not vary depending on the direction of a visual field, so that the eye point is fixed to the focal point 1 of the hyperboloid mirror 43. In this case, the main mirror and the sub-mirror are not necessarily in the shape of a hyperboloid, and may be a convex mirror having a focal point, such as a paraboloid mirror or an elliptical mirror.

In the above-described embodiments, a passenger vehicle has been described as an exemplary mobile body of the present invention. In addition, the present invention can be applied to automobiles, such as large-size or cargo vehicles (e.g., a bus, a truck, etc.), and air planes and ships. Particularly, in the case of cargo vehicles, a trailer thereof often blocks a rear view of the driver. Therefore, the mobile body surrounding surveillance apparatus 10 of the present invention is considerably useful for that type of vehicle. The present invention is also effective for vehicles, such as trains and the like. as well as automobiles.

Although is has not been described in the above-described embodiments, the omnidirectional vision sensor 4 may be provided at the lower portion of only one of the left-and right-hand outside rearview mirrors 2 and 3, but not each of them. In addition, the omnidirectional vision sensor 4 may be provided on at least one of front and rear portions of the vehicle 1. Further, the omnidirectional vision sensor 4 may be provided on an upper corner portion of an outside rearview mirror which has a lower visual field angle, an upper corner portion of a bumper which has a lower visual field angle (or a middle portion or an end portion), and an upper corner portion of a hood which has a lower visual field angle (or a middle portion or an end portion) as well as the lower portion of the outside rearview mirror.

Thus, the present invention provides a vehicle surrounding surveillance apparatus for surveillance of surroundings of a vehicle for transporting persons or things and a mobile body having the same. With the vehicle surrounding surveillance apparatus, an area (e.g., an area below a side of a vehicle, etc.) which is a blind spot from the driver's seat of a mobile body can be easily understood and confirmed as an image having a less sense of difference to the driver. Therefore, the driver can confirm the safety more accurately when the driver looks at surroundings of the vehicle when starting it, and looks at the right, left and rear directions of the vehicle when turning right or left or going in or out of a parking lot or a garage. Further, the driver does not have to switch the direction of a camera, so that the drive can perform safe driving. The present invention is considerably effective for safety of vehicles, such as automobiles, buses, trains and the like.

Although certain preferred embodiments have been described herein, it is not intended that such embodiments be construed as limitations on the scope of the invention except asset forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

What is claimed is:

1. A mobile body surrounding surveillance apparatus, comprising:
    an omnidirectional vision sensor comprising:
    an optical system for reflecting light incident from a maximum surrounding 360-degree visual field area toward a predetermined direction;
    an imaging section for imaging light reflected from the optical system to obtain image data;
    an image processing section for processing the image data obtained by the imaging section; and
    a display section for displaying the image data processed by the image processing section on a display screen as a mobile body surrounding image, wherein the omnidirectional vision sensor is provided on at least one of left and right sides of the mobile body with an optical axis of the omnidirectional vision sensor being horizontally oriented.

2. A mobile body surrounding surveillance apparatus according to claim 1, wherein the omnidirectional vision sensor is provided at a lower portion or an upper corner portion of an outside rearview mirror of the mobile body.

3. A mobile body surrounding surveillance apparatus according to claim 1, wherein
    the optical system has a hyperboloid mirror provided on one of convex surfaces of a two-sheeted hyperboloid generated by rotating a hyperbola around a z-axis,
    an optical axis of the imaging section coincides with a rotation axis of the hyperbola, and
    a principal point of a lens is provided at a position of one of two focal points of the hyperboloid mirror.

4. A mobile body surrounding surveillance apparatus according to claim 1, wherein the optical system has a plurality of convex mirrors having a focal point.

5. A mobile body surrounding surveillance apparatus according to claim 4, wherein the optical system comprises:
    a main curved surface mirror which is provided on one of convex surfaces of a two-sheeted curved surface generated by rotating a curved line around a z-axis, wherein
    a tip portion of the convex surface is removed through which light is transmitted; and
    a sub-curved surface mirror which is provided on the other convex surface, wherein the optical axis of the imaging section coincides with a rotation axis of the curved line, and a principal point of a lens is provided at one of two focal points of the sub-curved surface mirror.

6. A mobile body surrounding surveillance apparatus according to claim 5, wherein the two sheeted curved surface is a two-sheeted hyperboloid.

7. A mobile body surrounding surveillance apparatus according to claim 1, wherein the image processing section converts the image data obtained by the imaging section to at least one of panorama image data and perspective image data.

8. A mobile body surrounding surveillance apparatus according to claim 1, wherein the omnidirectional vision sensor is provided so that one of upper and lower visual field angles thereof is larger than the other.

9. A mobile body surrounding surveillance apparatus according to claim 8, wherein one of the upper and lower visual field angles of the omnidirectional vision sensor is between 5 degrees and 90 degrees and the other is between 50 degrees and 90 degrees.

10. A mobile body surrounding surveillance apparatus according to claim 1, wherein an inward visual field angle from the optical axis of the omnidirectional vision sensor toward the mobile body is smaller than an outward visual field angle thereof away from the mobile body.

11. A mobile body surrounding surveillance apparatus according to claim 10, wherein the omnidirectional vision sensor has a hyperboloid mirror which is provided closer to the mobile body than the imaging section, the hyperboloid mirror serving as the optical system, and the imaging section is provided outside the hyperboloid mirror.

12. A mobile body surrounding surveillance apparatus according to claim 2, wherein the omnidirectional vision sensor is swung in response to an open/close operation of the outside rearview mirror, and when the outside rearview mirror is open, the optical axis of the omnidirectional vision sensor is perpendicular to an anterior-posterior axis of the mobile body.

13. A mobile body surrounding surveillance apparatus according to claim 2, wherein the optical axis of the omnidirectional vision sensor is always perpendicular to an anterior-posterior axis of the mobile body.

14. A mobile body surrounding surveillance apparatus according to claim 1, wherein a center of an effective pixel region of an imaging device of the imaging section is shifted from the optical axis of the optical system so that the center of the effective pixel region of the imaging device is positioned above the optical axis of the omnidirectional vision sensor when the optical axis is horizontally oriented.

15. A mobile body surrounding surveillance apparatus according to claim 1, further comprising:
a display control section for controlling display of the display section, wherein the display control section selects and controls a type and a size of an image of surroundings of the mobile body displayed on the display section.

16. A mobile body surrounding surveillance apparatus according to claim 1, further comprising:
a display control section for controlling display of the display section; and
a mobile body location detecting section for detecting a location of the mobile body, wherein
the display section displays the location of the mobile body detected by the mobile body location detecting section as a location image on a map screen, and
the display control section switches an image of surroundings of the mobile body and the location image.

17. A mobile body, comprising a mobile body surrounding surveillance apparatus according to claim 1.

* * * * *